United States Patent Office 3,736,352
Patented May 29, 1973

---

3,736,352
PROCESS FOR RECOVERING ORGANIC
SULFONYL HALIDES
Carl D. Kennedy and Allan J. Lundeen, Ponca City,
Okla., assignors to Continental Oil Company, Ponca
City, Okla.
No Drawing. Continuation-in-part of application Ser. No.
868,922, Oct. 29, 1969. This application Apr. 7, 1972,
Ser. No. 242,245
Int. Cl. C07c *143/70*
U.S. Cl. 260—543 R                    10 Claims

ABSTRACT OF THE DISCLOSURE

Organic monosulfonyl halides are purified. A mixture comprising organic sulfonyl halides and unreacted paraffins is deparaffinized by admixing with a nitroalkane having 2 to 6 carbon atoms, cooling to precipitate the paraffin, and removing the solid paraffin from the liquid. Prior to deparaffinization, the mixture can be extracted with a selective solvent such as nitromethane to extract organic polysulfonyl halides and leave a mixture comprising monosulfonyl halides and paraffin, which is then deparaffinized. Subsequent to deparaffinization of a mixture comprising organic sulfonyl halides and unreacted paraffins, the polysulfonyl halides can then be extracted with a selective solvent such as nitromethane to leave purified monosulfonyl halides as a product.

---

This application is a continuation-in-part of application No. 868,922, filed Oct. 29, 1969, entitled "Process for Recovering Organic Sulfonyl Halides" by Carl D. Kennedy and Allan J. Lundeen.

BACKGROUND OF THE INVENTION

Field of the invention

This invention relates to a process for purifying organic sulfonyl halides.

Brief description of the prior art

The preparation of organic sulfonyl halides by the reaction of aliphatic organic compounds such as alkanes with sulfur dioxide and halogen is well known. However, in the preparation of organic sulfonyl halides, unreacted materials and various organic compounds are mixed with the desired sulfonyl halide products and because of the solvent action of the organic sulfonyl halides appreciable quantities of the unreacted paraffin (alkane), halogenated hydrocarbons, and like materials are maintained in solution and cannot readily be separated by physical methods.

The presence of these impurities has a detrimental effect on the reactivity of the sulfonyl halides and the efficiency of derivatives which may be prepared from the sulfonyl halide mixture. Such detrimental effect is shown by a lowering of the wetting, washing, and emulsifying efficiency of the organic sulfonates. Thus, for these and numerous other reasons it is highly desirous that these impurities be removed from the organic sulfonyl halides before the conversion to sulfonyl derivatives.

Several methods have been proposed to remove these impurities from the organic sulfonyl halides such as treating the crude reaction mixture with a selective solvent for the organic sulfonyl halides. Such a process is disclosed in U.S. Pat. 2,424,420. However, the extraction of the impurities by the prior art methods has not been very efficient, especially when one attempts to recover a relatively pure monosulfonyl chloride from a mixture containing mono and poly sulfonyl halides. For example, when employing the processes of the prior art in order to obtain a relatively pure monosulfonyl halide compound one obtains a product which contains about 3 to 20 weight percent of the polysulfonyl halides. Thus, new processes are constantly being sought wherein the impurities can readily be removed from the sulfonyl halide products and, at the same time, one can readily remove the polysulfonyl halides in order to recover a substantially pure monosulfonyl halide compound.

OBJECTS OF THE INVENTION

An object of the present invention is to provide an improved method for removing organic sulfonyl halides from unreacted materials and other organic impurities.

Another object of the invention is to provide an improved method for removing the polysulfonyl halides from a mixture containing mono and polysulfonyl halides so that one can recover a relatively pure monosulfonyl halide.

Another object of the invention is to provide an inexpensive, safe, and relatively simple process for extracting organic polysulfonyl halides from a reaction mixture produced by the reaction of $SO_2$ and halogen with an alkane and then recovering a relatively pure monosulfonyl halide constituent from the mixture of monosulfonyl halides and paraffin.

Another object of the invention is to provide a means for deparaffinizing a reaction product produced by the reaction of alkanes with sulfur dioxide and a halogen.

These and other objects and advantages of the present invention will be apparent to those skilled in the art from the reading of the detailed description given hereafter and the appended claims.

SUMMARY OF THE INVENTION

According to the present invention, we have now discovered an improved process for separating organic sulfonyl halides from a reaction mixture containing unreacted paraffins and other organic product impurities formed in the preparation of the organic sulfonyl halides. In one embodiment, the purification process comprises the sequential steps of first deparaffinizing the mixture and recovering a concentrated organic sulfonyl halide mixture. The monosulfonyl halides are then recovered from the concentrated organic sulfonyl halide mixture by contacting the mixture with a solvent preferential to the polysulfonyl halides. By deparaffinizing the mixture prior to extraction with the solvent preferential to the polysulfonyl halides a higher percentage of the polysulfonyl halides are removed and thus a more pure monosulfonyl halide can be recovered.

Furthermore, we have discovered that a reaction product containing unreacted paraffins, other organic product impurities, and sulfonyl halides is advantageously deparaffinized by mixing with a nitroalkane having 2 to 6 carbon atoms per molecule, cooling to precipitate the paraffins, and removing the solid paraffins from the remaining liquid.

Further, we have found that the process is much improved by the dilution of the concentrated organic sulfonyl halide mixture produced by the deparaffinization step with from about 10 to about 200 volume percent, based on the volume of the initial reaction mixture, of a paraffin (alkane) having at least one less carbon atom than the paraffin (alkane) employed to produce the organic sulfonyl halides.

Further, we have found that polysulfonyl halides are extracted from a reaction mixture formed by the reaction of an alkane, sulfur dioxide, and halogen to leave a mixture comprising a paraffin and a monosulfonyl halide; and that the mixture remaining after extraction with a selective solvent such as nitromethane is deparaffinized by admixing with a solvent such as a nitroalkane having 2 to 6 carbon atoms per molecule, cooling to solidify the paraffin, and separating the solidified paraffin from the remaining monosulfonyl halide plus solvent.

DESCRIPTION OF THE PREFERRED EMBODIMENTS

It has now been discovered that by first deparaffinizing a reaction mixture containing unreacted paraffins and other organic product impurities formed in the preparation of aliphatic sulfonyl halide and then treating the deparaffinized mixture with the solvent preferential to the polysulfonyl halides, the monosulfonyl halide can readily be recovered. By the use of the deparaffinizing step the monosulfonyl halide is readily separated from the polysulfonyl halides by the use of the preferential solvent, thus allowing one to obtain a substantially pure alkane monosulfonyl halide.

The preparation of organic sulfonyl halide derivatives by the so-called "Reed" reaction is well known to those skilled in the art. In preparing sulfonyl halides for conversion to sulfonates for incorporation into detergent formulations the paraffin employed in the starting reaction is a normal paraffin (alkane) containing from about 6 to 25 carbon atoms, preferably from about 10 to 18 carbon atoms. However, in producing sulfonyl halides by reacting a hydrocarbon such as a normal paraffin, with sulfur dioxide and a halogen a portion of the unreacted hydrocarbon-like material and halogenated derivatives thereof are present in the reaction product. In order to obtain a sulfonyl halide which can be sulfonated for incorporation into detergent formulations it is desirable that these impurities be removed. Further, it is desirous that the monosulfonyl halide derivatives be readily separated from the polysulfonyl halide derivatives. The term polysulfonyl halides as employed herein designates compounds which have 2 or more sulfonyl halide moieties. It is to the purification of the organic sulfonyl halides that the present invention is directed.

In carrying out the process of the present invention we have now found that by deparaffinizing the partially chlorosulfonated paraffin prior to extraction with a solvent preferential to the organic polysulfonyl halide constituents, that a higher percentage of the polysulfonyl halides are extracted but this fraction contains more mono-substituted alkane sulfonyl halides than the corresponding extract when extraction is carried out on crude partially chlorosulfonated paraffins. Thus, one important feature of the present invention is the sequential steps of deparaffinizing the mixture containing unreacted paraffins and other organic products formed in the preparation of the organic sulfonyl halides followed by the removal of the polysulfonyl halides from the resulting concentrated mixture with a solvent preferential to the polysulfonyl halides.

The deparaffinizing step of the present invention can be by any suitable method. Desirable results have been obtained wherein the deparaffinization is carried out by fractional crystallization. It is presently particularly preferred to employ fractional crystallization. When fractional crystallization is employed as the deparaffinizing step, about 1 part by volume of the crude reaction mixture produced by the "Reed" reaction is admixed with from about 0.1 to 5 (preferably about 1) parts by volume of a nitroalkane compound wherein the nitroalkane constituent contains from about 2 to 6 carbon atoms. The resulting mixture is agitated and cooled to a temperature wherein the unreacted paraffins commence to crystallize. Once crystallization has started the mixture is maintained at this temperature until the crystallization is substantially complete. The crystalline paraffins are then removed from the mixture by any suitable means such as filtration or centrifugation thus producing a liquid mixture containing the nitroalkane compound and the organic sulfonyl halide mixture. Examples of suitable nitroalkane compounds which can be employed in the crystallization step are nitroethane, nitropropane, 2-nitrobutane, 1-nitropentane, and 1-nitrohexane. Nitroethane and 1-nitropropane are presently particularly preferred.

The nitroalkane compound employed to facilitate the crystallization of the paraffins referred to above is then removed from the deparaffinized mixture by any suitable means, such as by evaporation to leave a mixture comprising monosulfonyl halides and polysulfonyl halides. When evaporation is employed it is important that the evaporation be carried out at a temperature below that which corresponds to the decomposition temperature of the organic sulfonyl halide mixture to prevent decomposition of said mixture. A vacuum can advantageously be employed to speed evaporation at low temperatures.

Subsequent to deparaffinization of the mixture comprising a monosulfonyl halide, a polysulfonyl halide, and a paraffin, the polysulfonyl halide is removed from the resulting concentrated mixture of polysulfonyl halides and monosulfonyl halides by solvent extraction with a solvent preferential for the polysulfonyl halides. Thus, subsequent to volatilizing the nitroalkane from the deparaffinized mixture, the mixture is contacted with about 0.1 to 100 volume percent, based on the volume of the mixture prior to deparaffinization, of a liquid solvent selected from the group consisting of: nitromethane, ethyl alcohol, dimethyl formamide, dimethyl sulfoxide, methyl formate, and liquid sulfur dioxide, the solvent preferentially dissolving the polysulfonyl halide of the mixture. The phase comprising the selective solvent plus polysulfonyl halide is separated from the phase comprising the organic monosulfonyl halide by any known method such as by decantation, or the like. Repeated successive extractions can be employed if desired. The phase comprising the polysulfonyl halide and the selective solvent can be separated by any suitable means such as by evaporation and presently preferably by a distillation at a reduced pressure and a temperature below that which corresponds to the decomposition temperature of the organic polysulfonyl halide and the selective solvent. The selective solvent can be recycled.

According to another aspect of the invention, a reaction product produced by the reaction of an alkane with sulfur dioxide and a halogen which comprises organic sulfonyl halides and unreacted alkane, is extracted with nitromethane to substantially completely remove alkane polysulfonyl halides therefrom, prior to deparaffinization by admixing a nitroalkane therewith, cooling, and separating the solidified paraffin therefrom. One such solvent extraction procedure follows. When solvent extraction is employed prior to deparaffinization, from about 0.1 to 100 parts by volume of nitromethane is admixed with each part by volume of the reaction mixture. Using repeated successive extractions, the nitromethane, which is preferential to the organic polysulfonyl halide mixture, separates most of the polysulfonyl halides from the unreacted paraffins and monosulfonyl halides also present in the reaction mixture. Each extraction mixture, upon standing, separates into two liquid phases and the liquid phase consisting mainly of the nitromethane fraction and thus the major portion of the organic polysulfonyl halides can be separated from the unreacted paraffin plus monosulfonyl halide rich layer. Such separation can be by any known methods such as decantation, or the like.

Once the unreacted paraffins and other organic products have been separated from the organic sulfonyl halides, by precipitating from the solvent, the solvent employed can be removed from the phase also containing the organic polysulfonyl halide by any suitable means such as evaporation wherein the evaporation such as a distillation is conducted at a pressure below that which corresponds to the decomposition temperature of the organic polysulfonyl halide. The other phase comprising the paraffin plus the organic monosulfonyl halide is then deparaffinized by crystallization from a nitroalkane as heretofore described.

Subsequent to deparaffinization of the reaction mixture comprising monosulfonyl halides, polysulfonyl halides, and alkane, the monosulfonyl halide derivatives can be readily recovered from the concentrated organic sulfonyl halide mixture formed by deparaffinization, and thus separated from the polysulfonyl halides by admixing from about 0.1 to 100 volume percent (preferably about 5 percent), based on the volume of the initial reaction mixture, of the solvent preferential to the polysulfonyl halides with the concentrated organic sulfonyl halide mixture and then removing the solvent thereby recovering a predominantly pure monosulfonyl halide. The monosulfonyl halide fraction is purified further by successive extractions.

One solvent preferential for the polysulfonyl halides is nitromethane. Other solvents suitable as the selective solvent media for extracting polysulfonyl halides from the deparaffinized mixture are ethyl alcohol, methyl formate, and other similar polar solvents.

The solvent preferential to the polysulfonyl halides is admixed with the concentrated organic sulfonyl halide mixture in a sufficient amount so that about 0.1 to 100 volume percent, based on the volume of the initial reaction mixture, is present. After complete mixing of the preferential solvent and the organic sulfonyl halide mixture the solvent rich fraction is separated thus allowing one to recover a predominantly pure monosulfonyl halide.

In addition, by incorporating from about 5 to about 200 volume percent, based on the volume of the initial reaction mixture, of a paraffin having at least one less carbon atom than the paraffin employed to make the organic sulfonyl halides, with the solvent preferential to the polysulfonyl halides the extraction of the deparaffinized organic sulfonyl halide mixture and thus the monosulfonyl halides from the admixture with the preferential solvent is even more selective. Any suitable paraffin can be employed, the only requirement being that the paraffin have at least one less carbon atom than the original paraffin employed in the "Reed" reaction for producing the sulfonyl halide mixture. By adding lighter paraffin to the concentrated "mixed" sulfonyl chloride mixture, the preferential solvent is made more selective toward the polysulfonyl halides in relation to monosulfonyl halide derivatives present in the organic sulfonyl halide mixture. Examples of suitable paraffins which can be employed for incorporation into the preferential solvent are pentane, hexane, heptane, octane, nonane, decane, undecane, dodecane, and the like.

The sulfonyl halides produced by the reaction mixture can contain as the halide constituent any of the halogens such as fluorine, chlorine, bromine, and iodine. However, as is apparent to those skilled in the art, the most common of the sulfonyl halides is the sulfonyl chloride derivative.

When removing the solvent preferential to the polysulfonyl halides such as the nitroalkane compound, from the deparaffinized mixture in order to recover the substantially pure monosulfonyl halide derivative it has been found advantageous to include from about 0.01 to 10 weight percent of an alkaline carbonate compound (based on the weight of the monosulfonyl halide) to stabilize the sulfonyl halides during separation of the same from the preferential solvent. The alkaline carbonate compound employed to stabilize the monosulfonyl halide during said separation includes both the alkaline metal carbonate compounds and the alkaline earth metal carbonate compounds which are well known in the art.

The separation of the solvent from the mixture containing the polysulfonyl halide derivatives can be by any suitable means, such as evaporation, and the like; however, this should be done under conditions which will not cause decomposition of the sulfonyl halide. As is evident to those skilled in the art the above procedures of deparaffinization and the removal of the polysulfonyl halide constituents can be repeated in sequence a number of times without departing from the scope of the present invention.

The resulting organic monosulfonyl halides can then be hydrolyzed to yield a sulfonate product relatively free from oil and other organic impurities and the resulting sulfonate can then be incorporated into detergent formulations. Likewise, it is evident that if desirable the polysulfonyl halide constituents can be recovered from the preferential solvent by any suitable means such as evaporation.

In carrying out the process of the present invention a broad temperature range can be employed. However, as is apparent when employing fractional crystallization as the deparaffinization method, the temperature must be maintained sufficiently low to allow the paraffins present to readily crystallize. The temperature, however, should not be so low as to solidify the nitroalkane or sulfonyl halide. Optimum crystallization temperatures for some exemplary paraffins are as follows:

| Number of carbons in paraffin: | Approximate crystallization temperature, ° C. |
|---|---|
| $C_{10}$ | −30 |
| $C_{12}$ | −25 |
| $C_{14}$ | −5 to 0 |
| $C_{15}$ | −5 |
| $C_{16}$ | −5 to 5 |
| $C_{18}$ | 20 to 25 |
| $C_{20}$ | 20 |

Suitable crystallization temperatures for other paraffins are readily available from standard reference books or are readily determinable by simple experiment not amounting to invention.

The solvent extraction and the extraction of the polysulfonyl halide derivative from the deparaffinized mixture sulfonyl halide derivatives are carried out at a temperature up to about 50° C. As is readily apparent, lower temperatures are generally conducive to greater selectivity. When the process is carried out at higher temperatures one must exercise care to insure that the temperature does not exceed the decomposition temperature of the sulfonyl halide products. In addition, higher temperature and pressures often create technical difficulties due to corrosion and the like.

In order to more fully understand the nature and objects of the present invention, reference is made to the following examples. However, these examples are given merely to illustrate the invention and are not to be construed as limiting the invention.

EXAMPLE 1

Sulfonyl halide derivatives were prepared by the "Reed" reaction wherein hexadecane was employed as the paraffin and chlorine was employed as the halogen. The unreacted hexadecane present in the reaction mixture was removed from hexadecane chlorosulfonated to the 32% level by crystallization from a nitroethane solution. The crystallization was conducted by cooling the reaction mixture with stirring to about −5° C. wherein the paraffin commenced to crystallize. Once the crystallization was complete the mixture was filtered through a coarse filter to remove the crystallized paraffin as a precipitate. The filtrate was evaporated by distillation at reduced pressure to remove the nitroethane therefrom. The separated "mixed" hexadecane sulfonyl chloride thusly concentrated was extracted seven times with 5 separate volume percent nitromethane portions based on the volume before the "Reed" reaction product was deparaffinized. TLC (thin layer chromatography) on each extract portion showed an average ratio of monosulfonyl chloride to polysulfonyl chloride of at least 3 to 1 in the extract with the monosulfonyl chloride concentration remaining reasonably constant whereas the polysulfonyl chloride fraction decreased very rapidy from the first to the fourth extraction. The ratio of monosulfonyl chloride to polysulfonyl chloride in the fourth extract was shown by TLC to be about 6 to 1. After seven extractions the polysulfonyl chloride concentration in the extracted fraction appeared on TLC only as a trace. The portion remaining was substantially monosulfonyl chloride.

EXAMPLE 2

Crude "Reed" reaction product from chlorosulfonation of hexadecane to about 32% was extracted with 4 portions of 5 volume percent nitromethane. As shown by TLC the ratio of monosulfonyl chloride to polysulfonyl chloride in the combined nitromethane extracts was between 2 to 3 and 1 to 2. After the four extractions, the polysulfonyl chloride concentration in the nitromethane extracted fraction remained about half original. The original crude "Reed" reaction product was estimated from TLC to contain about 8% polysulfonyl chlorides; thus the extracted fraction contained from about 3 to 4% polysulfonyl chloride. The portion remaining after extraction still contained a substantial amount of polysulfonyl chloride.

EXAMPLE 3

Hexadecane which was chlorosulfonated to the 32% level was deparaffinized as in Example 1. The concentrated "mixed" hexadecanesulfonyl chloride was diluted with an equal volume of hexane. The mixture was then extracted seven times with 3 volume percent portions of nitromethane based on crude volume before deparaffinization as in Example 1. The ratio of monosulfonyl chloride to polysulfonyl chloride in each extract was about 3 to 4, the concentration of both decreasing with each successive extraction. The concentration of polysulfonyl chloride in the remaining nitromethane extracted fraction was determined from TLC to be about 1%. The portion remaining after extraction was substantially pure monosulfonyl halide.

EXAMPLE 4 n-Hexane (15 volume percent) was added to an identical sample of chlorosulfonated hexadecane to that used in Example 2. The mixture was extracted five times with 5 volume percent nitromethane in each portion based on the partially chlorosulfonated hexadecane. TLC showed no significant increase in the amount of polysulfonyl chloride removed as compared to Example 2.

The results of Examples 1, 2, 3, and 4 are summarized in the following Table I.

preferential solvent was used per extraction, the polysulfonyl halide was removed more completely when the deparaffinization step preceded the solvent extraction step than in the case of Example 2 wherein the crude "Reed" reaction product was extracted without the incorporation of the deparaffinization step. Further, addition of the lighter paraffin to the crude chlorosulfonation product prior to extraction with the preferential solvent did not significantly change the extraction properties as compared to extraction of crude "Reed" reaction product.

EXAMPLE 5

Crude "Reed" reaction product from chlorosulfonation of hexadecane to about 32% is extracted with nitromethane to remove substantially all of the polysulfonyl chloride. The material remaining after the liquid-liquid extraction with the nitromethane comprises essentially hexadecane plus hexadecane monosulfonyl chloride. One part by weight of the remaining extracted material is admixed with one part by weight of nitroethane. The resulting mixture is cooled with stirring to precipitate the hexadecane therein. When the temperature reaches about 0° C., the hexadecane is substantially completely solidified. The material is then filtered at about 0° C. to remove the solidified paraffin.

The deparaffinized filtrate is then admixed with about 2 percent by weight of barium carbonate based on the weight of the hexadecane sulfonyl chloride present. The resulting admixture is then subjected to evaporation by distillation at about 60° C. and 3 mm. Hg pressure. The nitroethane is recovered as a distillate. The residue is filtered to remove the barium carbonate therefrom and yield a purified hexadecane sulfonyl chloride.

As apparent to those skilled in the art, variations and modifications can be made on the present invention without departing from the spirit and scope thereof, and it is to be understood that this application is not limited to the specific embodiments disclosed herein except as defined in the appended claims. Having thus described the invention, we claim:

1. A process for deparaffinizing a reaction product produced by the reaction of an alkane with sulfur dioxide and a halogen comprising:
  (A) admixing 0.1 to 5 parts by volume of a nitroalkane having 2 to 6 carbon atoms per molecule per part by volume of the reaction product to form a resulting mixture;

TABLE I

| Ex. No. | Volume percent per nitromethane[1] extraction | Total | Number of extractions | Nature of material extracted | Ratio of "mono" to "poly" in 4th nitromethane extract | Percent poly in product (estimates from TLC) |
| --- | --- | --- | --- | --- | --- | --- |
| 1 | 5 | 35 | 7 | Deparaffinized | 8/1 | 2-1 |
| 2 | 5 | 20 | 4 | Crude "Reed" reaction product | | 3-4 |
| 3 | 3 | 21 | 7 | Deparaffinized, then an equal volume of hexane was added to the concentrated alkane sulfonyl chloride | 2/3 | 1 |
| 4 | 5 | 25 | 5 | 15 volume percent hexane was added to crude "Reed" reaction product | 4/1 | 3-1 |

[1] Based on volume of crude partially chlorosulfonated paraffin.

The above data clearly shows that if the partially chlorosulfonated paraffin is deparaffinized prior to extraction with a preferential solvent a higher percentage of mono-substituted alkane sulfonyl halide is removed than when the extraction is carried out on crude partially chlorosulfonated paraffin; moreover, the amount of polysulfonyl halide extracted per volume of preferential solvent is also higher for extraction of deparaffinized alkane sulfonyl halide than crude partially chlorosulfonated paraffin. The extraction of deparaffinized alkane sulfonyl halide with a preferential solvent is made even more efficient by prior dilution with a normal paraffin having less carbon atoms than the original paraffin employed in the "Reed" reaction. Though, as shown by Example 3, a lesser volume of (B) cooling the resulting mixture to a temperature wherein the paraffin commences to solidify and maintaining the lower temperature until the solidification of the paraffin is substantially complete; and
  (C) separating the solidified paraffin therefrom.

2. The process of claim 1 wherein the reaction product comprises organic sulfonyl halides and unreacted alkanes; wherein the alkane is a normal paraffin having 6 to 25 carbon atoms per molecule; and wherein the organic sulfonyl halide is a normal alkane sulfonyl chloride having 6 to 25 carbon atoms per molecule.

3. The process of claim 2 wherein the nitroalkane is nitroethane or 1-nitropropane, 4. The process of claim 3 wherein the nitroalkane is nitroethane.

5. The process of claim 1 wherein the reaction product produced by the reaction of an alkane with sulfur dioxide and a halogen is extracted with nitromethane to substantially completely remove alkane polysulfonyl halides therefrom, and the remaining material consisting essentially of an alkane monosulfonyl halide and a paraffin is then deparaffinized by steps (A), (B), and (C) of claim 1.

6. The process of claim 5 wherein the reaction product is produced by the reaction of a normal paraffin having 6 to 25 carbon atoms per molecule with sulfur dioxide and chlorine; and wherein the nitroalkane of step (A) is nitroethane or 1-nitropropane.

7. The process of claim 6 wherein the nitroalkane of step (A) is nitroethane; wherein the material deparaffinized by steps (A), (B), and (C) consists essentially of a normal paraffin sulfonyl chloride and a normal paraffin; and wherein subsequent to step (C), the nitroethane is evaporated from the liquid solution remaining after the paraffin is separated to recover purified normal alkane sulfonyl chloride.

8. A process for separating a purified organic monosulfonyl halide from a first mixture comprising a monosulfonyl halide, a polysulfonyl halide, and a first paraffin which comprises in sequence:
(A) admixing 0.1 to 5 parts by volume of a nitroalkane having 2 to 6 carbon atoms per molecule per part by volume of the first mixture to form a resulting second mixture;
(B) cooling the resulting second mixture to a temperature wherein the paraffin commences to crystallize and maintaining the lower temperature until crystallization is substantially complete;
(C) separating the crystallized paraffin therefrom;
(D) recovering a deparaffinized concentrated third mixture comprising a monosulfonyl halide and a polysulfonyl halide by volatilizing the first solvent of (A) from the remaining liquid of (C) at a temperature below the decomposition temperature of any organic sulfonyl halide within the third mixture;
(E) contacting the third mixture of (D) with about 0.1 to 100 volume percent, based on the volume of the first mixture, of a liquid solvent selected from the group consisting of: nitromethane, ethyl alcohol, dimethyl formamide, dimethyl sulfoxide, methyl formate, and liquid sulfur dioxide, said liquid solvent preferentially dissolving the polysulfonyl halide of the third mixture; and
(F) separating the solution phase formed in (E) from the purified organic monosulfonyl halide to recover the purified organic monosulfonyl halide.

9. The process of claim 8 wherein the liquid solvent of (E) is nitromethane; wherein about 0.01 to 10 weight percent, based on the weight of the organic monosulfonyl halide, of an alkaline carbonate compound is added to the third mixture of (D) prior to volatilizing the first solvent therefrom, but subsequent to step (C); wherein about 5 to 200 volume percent, based on the volume of the first mixture, of a second paraffin, which has at least one less carbon atom per molecule than the first paraffin of the first mixture, is added to the liquid solvent of (E) prior to separation in step (F); wherein the first mixture is derived by reaction of the first paraffin with sulfur dioxide and a halogen; and wherein the organic monosulfonyl halide is a normal alkane sulfonyl chloride having 6 to 25 carbon atoms per molecule.

10. The process of claim 9 wherein the nitroalkane of (A) is nitroethane and wherein the liquid solvent of (E) is nitromethane.

References Cited
UNITED STATES PATENTS 2,424,420 7/1947 Ramsey et al. ____ 260—543 R
2,749,365 6/1956 Dazzi _____ 260—543 R

OTHER REFERENCES

Asinger et al.: Erdoel, Kohle 18 (4) (1965), pp. 273–81.

LORRAINE A. WEINBERGER, Primary Examiner

R. D. KELL, Assistant Examiner